United States Patent Office 3,008,977
Patented Nov. 14, 1961

3,008,977
PHOSPHONIC AND PHOSPHINIC ACID ESTERS AND PROCESS FOR THEIR PRODUCTION
Gerhard Schrader, Wuppertal-Cronenberg, Germany, assignor to Farbenfabriken Bayer Aktiengesellschaft, Leverkusen, Germany, a corporation of Germany
No Drawing. Filed May 24, 1960, Ser. No. 31,260
Claims priority, application Germany May 26, 1959
5 Claims. (Cl. 260—461)

The present invention relates to and has as its objects new and useful insecticidal phosphonic and phosphinic acid esters and processes for their production. The new compounds of the present invention may be represented by the following general formula

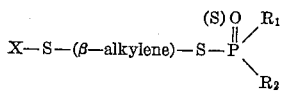

wherein $R_1$ and $R_2$ stand for radicals which are necessary for the formation of phosphonic or phosphinic acid derivatives. X represents an optional radical of an organic sulfhydryl-containing compound of the thiocarbonic and thiocarbamic acid group.

The compounds of this invention are obtainable by methods known in principle, especially by reacting S-(β-bromoalkyl)-O.O-dialkyl-thiolphosphoric acid esters with suitable thiolcarbonic or -carbamic acid derivatives as it is to be seen from the following equation:

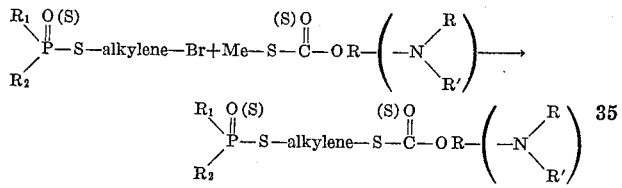

$R_1$ and $R_2$ have the same significance as said above, more specifically they are low molecular aliphatic radicals, R and R' are of same nature, Me is preferably an alkali metal or ammonium radical.

For reacting the above mentioned bromo-compounds with optional compounds containing sul-hydryl-groups alkali metal alcoholates can be used as acid-binding agent with good results.

It is sometimes also possible to start advantageously from the alkali metal salts of mercaptans or the alkali metal salts of other compounds containing sulf-hydryl groups.

The reaction is normally carried out in a suitable solvent. Acetone has proved to be especially satisfactory as a solvent of this type. It is, however, also possible to use, for example, a mixture of water and aceto-nitrile as the solvent. The reaction can sometimes also be carried out in the presence of alcohols.

The compounds, which are new, obtainable in the aforementioned way are distinguished by a good contact-insecticidal and systemic activity.

As an example for the special utility of the inventitive compounds the compound of the following formula

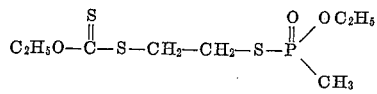

has been tested against aphids. Aqueous dilutions of the aforementioned compound have been prepared by mixing the active ingredient with the same amount of dimethyl formamide as an auxiliary solvent adding thereto 20% by weight referred to active ingredient of a commercial emulsifier consisting of a benzyl hydroxy polyglycol ether containing about 10 to 15 glycol ethers, and diluting at last this premixture with water to the desired concentration indicated in the following paragraph.

The test has been carried out as follows: against aphids of the type *Doralis fabae:* heavily infested bean plants (*Vicia faba*) have been sprayed drip wet with solutions as prepared above. The effect has been determined after 24 hours by counting the dead pests either on the surface of the soil or still remaining on the plants. The following results have been obtained: aphids were killed completely with 0.001% solutions.

The following examples are given to illustrate the present invention.

Example 1

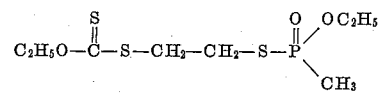

40 grams (0.25 mol) of potassium xanthogenate are dissolved in 150 ml. of acetone. 62 grams (0.25 mol) of S-β-bromo-ethyl-O-ethyl methyl phosphonate are added with stirring at 40° C. The mixture is heated to 45° for 2 hours and then cooled to room temperature. The reaction product is put into 300 ml. of ice-water. The separated oil is taken up in benzene, washed neutral with water and dried with sodium sulfate. By distilling off the solvent 50 grams of the new ester are obtained as a weakly yellow water-insoluble oil. The ester is not distillable even in high vacuum. Yield: 69% of the theoretical.

By the same way there may be obtained the compounds of the following formulae:

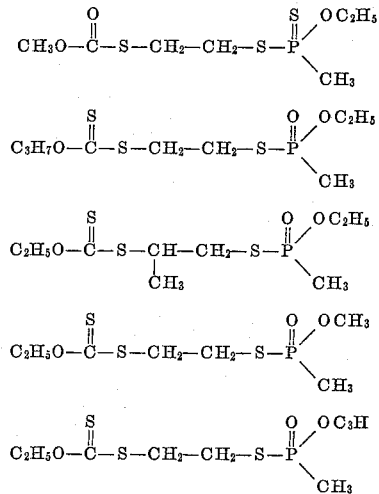

Example 2

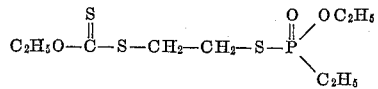

40 (0.25 mol) grams of potassium xanthogenate are dissolved in 150 ml. of acetone. At 50° C. there are added with stirring 66 grams (0.25 mol) of S-β-bromo-ethyl-O-ethyl ethylphosphonate. Heating is continued for 2 hours at 50° C. followed by working up as described in the previous examples. In this way 48 grams of the new ester are obtained as a yellow water-insoluble oil. Yield: 77% of the theoretical. The ester is not distillable even in a high vacuum.

Aphids are killed completely with 0.01% solutions, spider mites are killed completely with 0.001% solutions and caterpillars are killed to 100% with 0.1% solutions. Systemic action with 0.1% solutions=100%.

By the same way there may be obtained the compounds of the following formulae:

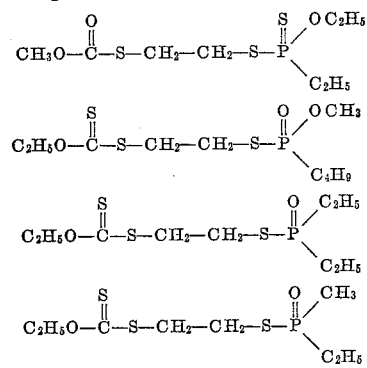

*Example 3*

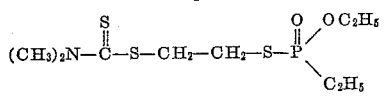

36 grams (0.25 mol) of dimethylamino-dithiocarbamic acid sodium salt are dissolved in 150 ml. of acetone; 5 ml. of water are added to the solution and then 66 grams (0.25 mol) of S-β-bromo-ethyl-O-ethyl ethylphosphonate are added dropwise at 50° C. with stirring. Heating is continued at 50° C. for 2 hours followed by working up in the usual way. 62 grams of the new ester are obtained as a yellow viscous oil. Yield: 82% of the theoretical. The ester is not distillable even in a high vacuum.

Aphids are killed completely with 0.01% solutions, spider mites with 0.001% solutions and caterpillars with 0.1% solutions. Systemic action with 0.1% solutions=100%.

By the same way there may be obtained the compounds of the following formulae:

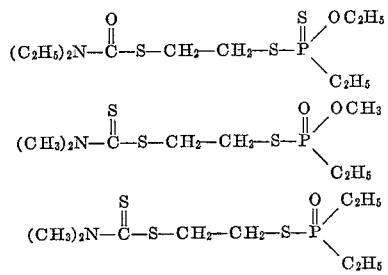

*Example 4*

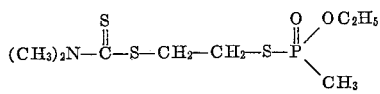

36 grams (0.25 mol) of dimethylamino-dithiocarbamic acid sodium salt are dissolved in 150 ml. of acetone. 5 ml. of water are added to the acetone solution which is then stirred while 62 grams (0.25 mol) of S-β-bromo-ethyl-O-ethyl methylphosphonate are run in at 55° C.

The reaction product is held at 55° C. for a further 3 hours and then worked up in the usual way. 57 grams of the new ester are obtained as a yellow water-insoluble oil. Yield: 79% of the theoretical. The ester is not distillable even in a high vacuum.

0.001% solutions kill aphids to 60% and spider mites to 100%. Caterpillars are killed completely with 0.1% solutions. Systemic action with 0.1% solutions=100%.

By the same way there may be obtained the compounds of the following formulae:

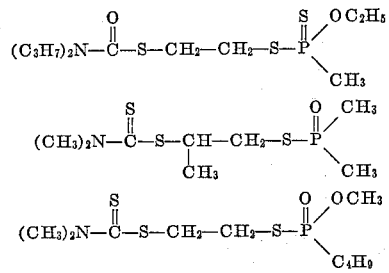

I claim:

1. The phosphorus ester of the following formula

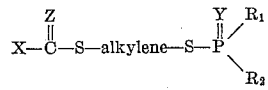

in which $R_1$ and $R_2$ stand for a member selected from the group consisting of lower alkyl radicals having up to 4 carbon atoms and lower alkoxy having up to 4 carbon atoms, alkylene being a lower alkylene group having up to 4 carbon atoms, Y and Z being a member selected from the group consisting of oxygen and sulfur, and X stands for a member selected from the group consisting of lower alkoxy and lower dialkyl-amino-groups, the alkyl radicals having up to 4 carbon atoms.

2. The compound of the following formula

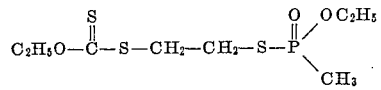

3. The compound of the following formula

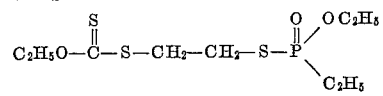

4. The compound of the following formula

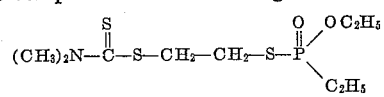

5. The compound of the following formula

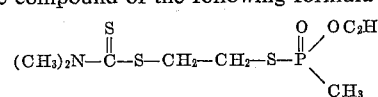

No references cited.

UNITED STATES PATENT OFFICE
CERTIFICATE OF CORRECTION

Patent No. 3,008,977                        November 14, 1961

Gerhard Schrader

It is hereby certified that error appears in the above numbered patent requiring correction and that the said Letters Patent should read as corrected below.

Column 1, line 44, for "sul-hydryl-" read -- sulf-hydryl- --; same column, line 60, for "inventitive" read -- inventive --; column 2, between lines 50 and 53, the formula should appear as shown below instead of as in the patent:

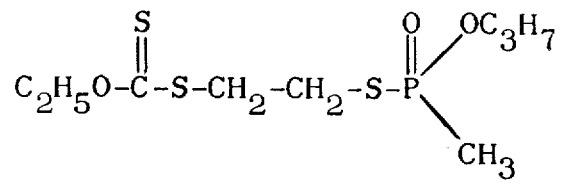

Signed and sealed this 8th day of May 1962.

(SEAL)
Attest:
ERNEST W. SWIDER
Attesting Officer

DAVID L. LADD
Commissioner of Patents